April 30, 1929.  L. LLEWELLYN ET AL  1,710,883
CONVEYER
Filed Aug. 25, 1926  2 Sheets-Sheet 2

Inventors
Lee Llewellyn
Carl L. Kinney
By C. M. Clarke
Attorney

Patented Apr. 30, 1929.

1,710,883

UNITED STATES PATENT OFFICE.

LEE LLEWELLYN AND CARL L. KENNEY, OF DORMONT, PENNSYLVANIA, ASSIGNORS TO PITTSBURGH COAL WASHER COMPANY, OF PITTSBURGH, PENNSYLVANIA, A CORPORATION OF PENNSYLVANIA.

CONVEYER.

Application filed August 25, 1926. Serial No. 131,440.

Our invention refers to improvements in conveyers, and is particularly designed for conveying coal or other minerals of varying size. It is particularly designed in connection with the transfer of screened coal, over and from a picking table onto a lip screen or chute to a loading boom or the like.

In such mechanism it is desirable to deliver the coal from the conveyer to the lip screen without loss of the smaller lumps, and with leakage of dust and fine particles only.

Ordinarily, with the usual sectional slat conveyer, the sections or pans are flat, forming a continuous straight moving floor, but with de-formation over the delivery sprocket, resulting in a continuous series of annularly moving flat faces. These, of course, conform generally to the planes of the edges of the sprocket chain links, rendering it impossible to locate the receiving edge of a lip screen closer than the outer meeting edges of the slats.

The result is that there is a considerable space between the middle of the slat and the clearing edge of the lip screen each time a slat passes around the sprocket, with resulting undesirable leakage.

In our invention we overcome this difficulty by arching the individual slats or sections of the conveyer to a radius corresponding to that of the pitch center of the conveyer pans around the sprocket, so that in delivering thereover the several sections will approximately form a continuous circumferential delivery surface of uniform radius.

By such arrangement the receiving edge of the lip screen may be located closely adjacent the conveyer surfaces, with slight clearance only, and with no variation or alternating openings for leakage.

In the drawings illustrating one preferred embodiment of the invention,—

Figure 1:
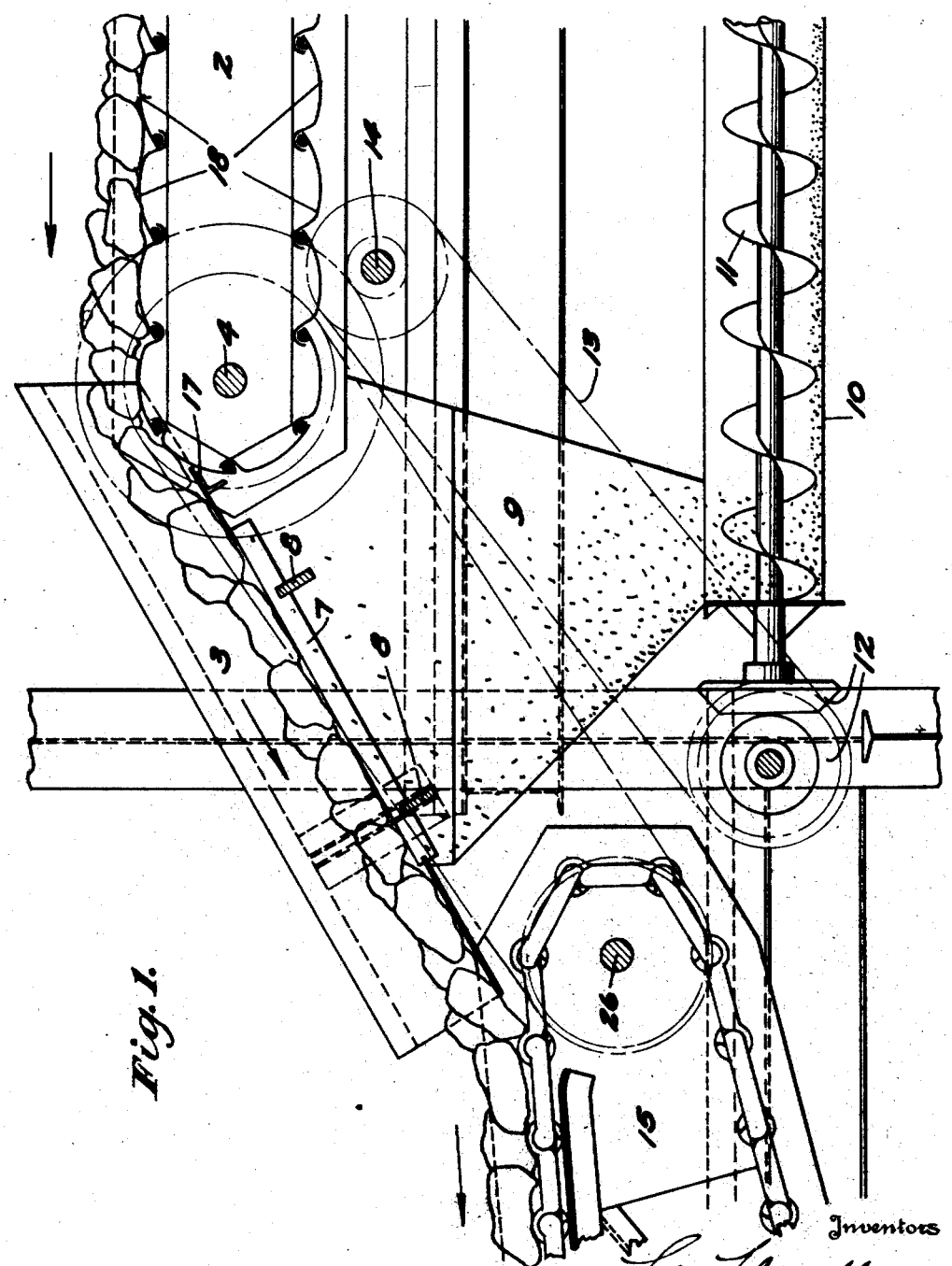
Fig. 1 is a longitudinal vertical section showing the picking table conveyer, lip screen, and the conveyer of a loading boom or the like in operative relation.
Figure 2:
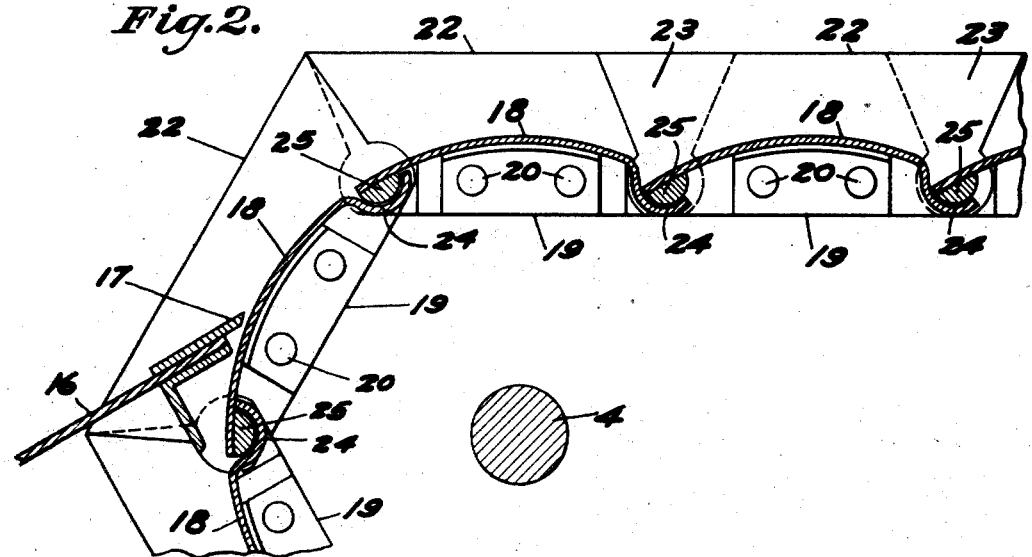
Fig. 2 is an enlarged similar section of the delivery end of the picking table.
Figure 3:
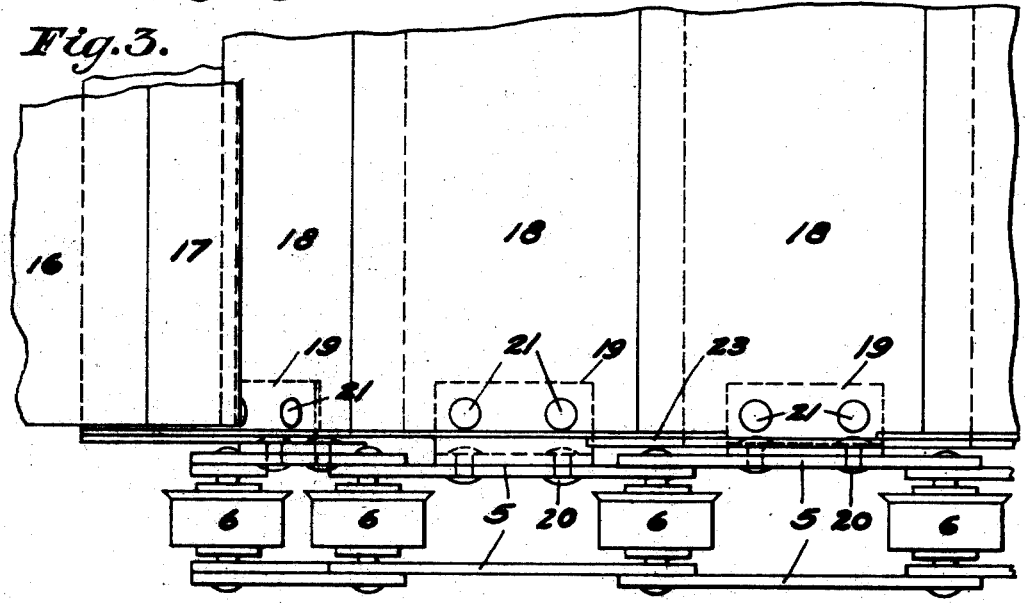
Fig. 3 is a plan view of Fig. 2.

Referring to the drawings, 2 represents the delivery end of the traveling conveyer section comprising the picking table, over which the coal or other supported mineral is moved for picking and final delivery onto the inclined screen section 3.

The picking table is of any suitable length and is provided with the tail shaft 4 having the usual sprocket wheels for engaging and transmitting movement to sprocket chains 5 having the usual supporting track wheels 6, of well known construction.

Screen 3 is of any suitable kind, as a bar screen, provided with longitudinally arranged inclined bars 7 spaced apart for the desired distance for screening dust, etc., and mounted on cross bars 8 in the supporting frame-work of the structure. Screened material passes by gravity into hopper 9 leading to the trough 10 having the screw conveyer 11 for removal to any suitable point. The shaft of the screw conveyer is driven through bevel or other gearing 12 by belt or chain 13 from driving shaft 14, which is geared with the shaft 4 as indicated in Fig. 1.

The conveyer 15 of the loading boom or of any other conveyer construction receives the larger screened coal from chute 3 for transportation to any point of delivery.

Screen 3 is of the class known as a lip screen, provided with a short section of plate 16 terminating in an inner receiving lip 17, the end of which is desirably located as closely as possible to the peripheral supporting surface of the pans or sections 18 of the picking table conveyer.

Sections 18, as shown, are curved to a uniform radius, defined from the center of shaft 4 and corresponding to the pitch line of the surface of such sections, so that, when they lie in a continuous horizontal position, they comprise a continuous series of arched supporting flights.

On the other hand, when they pass around the sprocket wheels of shaft 4, they assume by their outer supporting surfaces a uniform circumferential curvature, of practically unvarying radius.

By such means the surfaces of flights 18 are maintained in substantially uniform relation to the inner edge of lip 17, with but slight intervening clearance space, so that the coal is delivered from the flights onto the lip extension, and received thereby without loss or crushing of any of the useful smaller lumps.

Flights 18, as shown, are mounted on the inner faces of inner links 5 by means of angle brackets 19 riveted or bolted to the links as at 20, and to the end portions of the curved flights, preferably by countersunk rivets as at 21. Each flight is provided with an upwardly extending edge portion 22, longitudinally extended at each end so as to overlap and underlap the adjacent side of the several sections continuously, as indicated at 23.

The side portions of the flights as thus made, alternate in the same manner as the links 5, providing for expansion of the side retaining portions in rounding the sprocket wheels and preventing lateral escape of the material.

The cross end portions of each flight also overlap and underlap each other, by means of the rounded trough shaped embracing terminal 24 at one end and the interfitting semi-cylindrical bar 25 of the next adjacent flight, secured thereto by welding or in any other suitable way.

By such construction, utilizing alternating interfitting male and female terminals, there is a close rounded joint provided for each pivotally connected flight, at points corresponding to the pivotal connection of links 5, providing for easy movement around the sprockets.

The flights as thus constructed and mounted, are operated continuously at the proper speed, carrying all of the mineral along through the picking table section for removal of slate or other impurities, and delivering to the screen section 3 for separation of the dust etc.

The several parts are operated by any suitable drive or prime mover from shaft 14 as described, head shaft 26 of conveyer 15 being driven through sprocket or belt gearing from tail shaft 4, as shown in Fig. 1.

The construction is comparatively simple and effects a very considerable saving in merchantable coal because of the close connection between the conveyer bottoms and the end of the lip screen. Section 17 of the screen is preferably beveled at its inner end, and may be renewed from time to time if worn or broken.

The construction may be of any suitable size, or variously changed in different parts, or adapted to other combinations by the builder, but all such changes are to be understood as within the scope of the following claims.

What we claim is:

1. A conveyer flight having an outwardly curved body portion and having a reversely rounded concaved portion at one end for journal connection with an adjacent flight terminal, and at the other end a part-cylindrical bar conforming to the concaved portion of an adjacent flight.

2. A conveyer flight made of sheet or plate metal rounded to approximate the pitch curvature of a driving sprocket and having alternately concaved and convexed oppositely located edge portions for interfitting connection with similar adjacent flights, the convexed portion consisting of a part-cylindrical bar.

3. A conveyer flight made of sheet or plate metal rounded to approximate the pitch curvature of a driving sprocket and having at one end a concaved edge for interfitting engagement with an adjacent flight and at the other edge a part cylindrical bearing rod for engagement with a similarly concaved edge of an adjacent flight.

4. A conveyer flight made of sheet or plate metal rounded to approximate the pitch curvature of a driving sprocket and having alternately concaved and convexed oppositely located edge portions for interfitting connection with similar adjacent flights, the convexed portion consisting of a part-cylindrical bar secured to the under edge of the flight, and outwardly extending side portions.

5. A conveyer flight made of sheet or plate metal rounded to approximate the pitch curvature of a driving sprocket and having alternately concaved and convexed oppositely located edge portions for interfitting connection with similar adjacent flights, the convexed portion consisting of a part-cylindrical bar secured to the under edge of the flight, and outwardly extending elongated side portions for alternating outer and inner overlapping engagement with similar adjacent side portions.

6. A conveyer flight having an outwardly curved body portion and a reversely rounded part cylindrical seating portion at one end for journal connection with the terminal of an adjacent outwardly curved flight, the outwardly curved body portion maintaining its curvature to the opposite edge terminal and having at its under side a partly cylindrical portion for interfitting engagement with the seating portion of a similar adjacent flight.

In testimony whereof we hereunto affix our signatures.

LEE LLEWELLYN.
C. L. KENNEY.